United States Patent
Thome et al.

(10) Patent No.: US 11,531,405 B2
(45) Date of Patent: Dec. 20, 2022

(54) MULTI-AXIS RETENTION ASSEMBLY

(71) Applicant: Microsoft Technology Licensing, LLC, Redmond, WA (US)

(72) Inventors: Nathan Michael Thome, Kirkland, WA (US); Aseem Singla, Redmond, WA (US); Robyn Rebecca Reed McLaughlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/325,002

(22) Filed: May 19, 2021

(65) Prior Publication Data

US 2022/0374090 A1 Nov. 24, 2022

(51) Int. Cl.
*G06F 3/02* (2006.01)
*G06F 3/039* (2013.01)

(52) U.S. Cl.
CPC .......... *G06F 3/0227* (2013.01); *G06F 3/0224* (2013.01); *G06F 3/039* (2013.01)

(58) Field of Classification Search
CPC ....... G06F 3/0227; G06F 3/0224; G06F 3/039
USPC .......... 345/156; 713/300; 455/575.6
See application file for complete search history.

(56) References Cited

U.S. PATENT DOCUMENTS

| | | | |
|---|---|---|---|
| 6,681,333 B1 * | 1/2004 | Cho ................ | G06F 1/26 713/300 |
| 8,496,100 B2 * | 7/2013 | Fergusson ........ | G07F 1/047 194/344 |
| 10,031,557 B1 * | 7/2018 | Morrison .......... | G06F 1/189 |
| 2005/0090206 A1 | 4/2005 | Hyun et al. | |
| 2006/0166720 A1 * | 7/2006 | Dixon ............... | H04B 1/385 455/575.6 |
| 2011/0102979 A1 | 5/2011 | Jinkinson et al. | |
| 2015/0378397 A1 | 12/2015 | Takayanagi et al. | |
| 2015/0378455 A1 | 12/2015 | Basey et al. | |
| 2016/0352383 A1 * | 12/2016 | Richmond ........ | A45C 11/00 |
| 2018/0059817 A1 | 3/2018 | Pirie et al. | |
| 2020/0174529 A1 | 6/2020 | Goh et al. | |
| 2020/0174530 A1 | 6/2020 | Wu et al. | |

FOREIGN PATENT DOCUMENTS

DE 202018100371 U1 4/2019
EP 0565115 A2 10/1993

OTHER PUBLICATIONS

Dirak Dieter Ramsauer Konstruk Electronic control system Jul. 28, 2005 Dirak Dieter Ramsauer Konstruk Description DE202004004273U1 paragraphs 30-33 figures 2A, 2B English Translation.*

(Continued)

*Primary Examiner* — Prabodh M Dharia
(74) *Attorney, Agent, or Firm* — Rainier Patents, P.S.

(57) ABSTRACT

The patent relates to securely storing an input device relative to a computing device. One example can include a housing and a trough defined in the housing and configured to receive at least a portion of an input device. This example can also include a pair of opposing levers that are contained in the trough when the trough is empty and that pivot proud out of the trough around and against the input device installed in the trough.

20 Claims, 7 Drawing Sheets

(56) References Cited

OTHER PUBLICATIONS

Dirak Dieter Ramsauer Konstruk Electronic control system Jul. 28, 2005 Dirak Dieter Ramsauer Konstruk Description DE202004004273U1 paragraphs 30-33 figures 2A, 2B Original Documents.*

"International Search Report & Written Opinion issued in PCT Application No. PCT/US22/026422", dated Aug. 12, 2022, 15 Pages.

* cited by examiner

MULTI-AXIS RETENTION ASSEMBLY

BACKGROUND

Many portable computer form factors, such as smart phones, tablets, and notebook computers can benefit from a having a complementary input device, such as a stylus and/or mouse. However, the user experience is diminished when the input device is lost or misplaced.

SUMMARY

The description relates to securely storing an input device relative to a computing device. One example can include a housing and a trough defined in the housing and configured to receive at least a portion of an input device. This example can also include a pair of opposing levers that are contained in the trough when the trough is empty and that pivot proud out of the trough around and against the input device installed in the trough.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices that can be controlled by, or otherwise communicate with a separate input device. Many portable computer form factors such as smart phones, tablets, and notebook computers can benefit from having a complementary input device, such as a stylus and/or mouse. However, the user experience is diminished when the input device is lost or misplaced. Various techniques have been tried to retain the input device on the computing device when not in use. However, those that are convenient and store the input device in a readily accessible fashion tend not to be reliable and the input device can get knocked off and lost. Other techniques that offer enhanced retention lack convenience and users tend not to utilize them and then eventually lose the input device. For instance, some existing techniques totally encase the input device in the device. This configuration consumes a large amount of device real estate and causes the device to be thicker (e.g., the device has to be thicker than the input device). The present implementations address these and/or other aspects.

In some of the present implementations, the device can include a surface that includes a trough for receiving and storing the input device when the input device is not being used. The trough can be part of a retention assembly that provides retention forces to retain the input device so it is does not fall out and is retained until the user removes the input device. In order to ensure that the input device is retained, the retention assembly can provide retention forces both perpendicular to and parallel to the surface. Thus, the retention assembly can be characterized as a 'multi-axis retention assembly'. These and other aspects are described below.

Figure 1A:
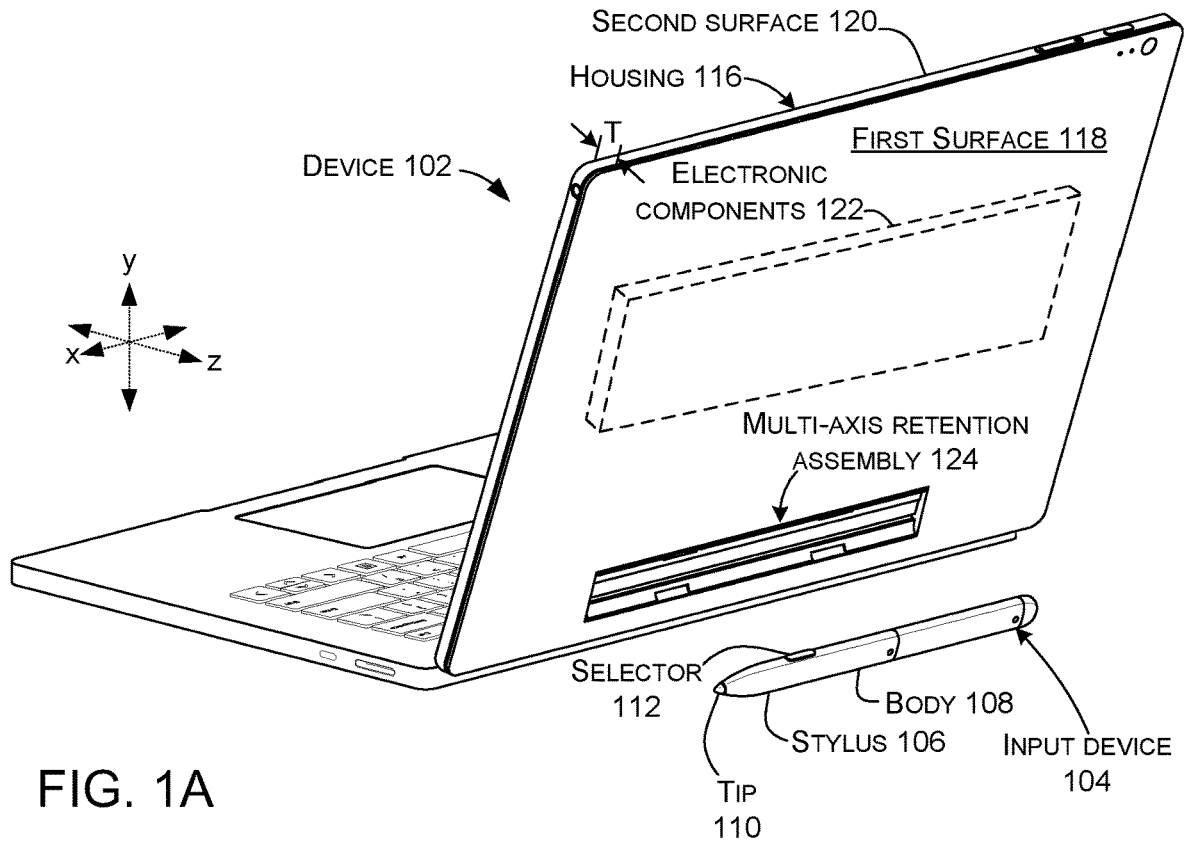
FIGS. 1A, 1B, 2A, 2B, 4A, 4B, 5A, and 5B show perspective views of example devices and systems in accordance with some implementations of the present concepts.
Figure 1B:
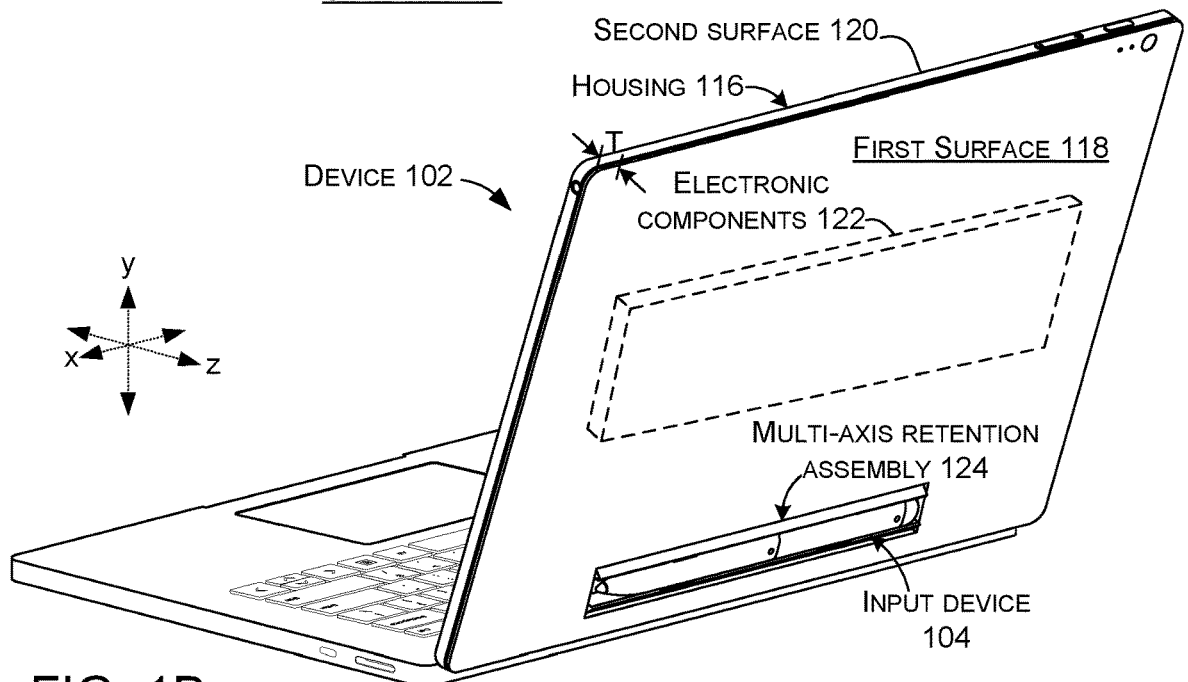
Figure 2A:
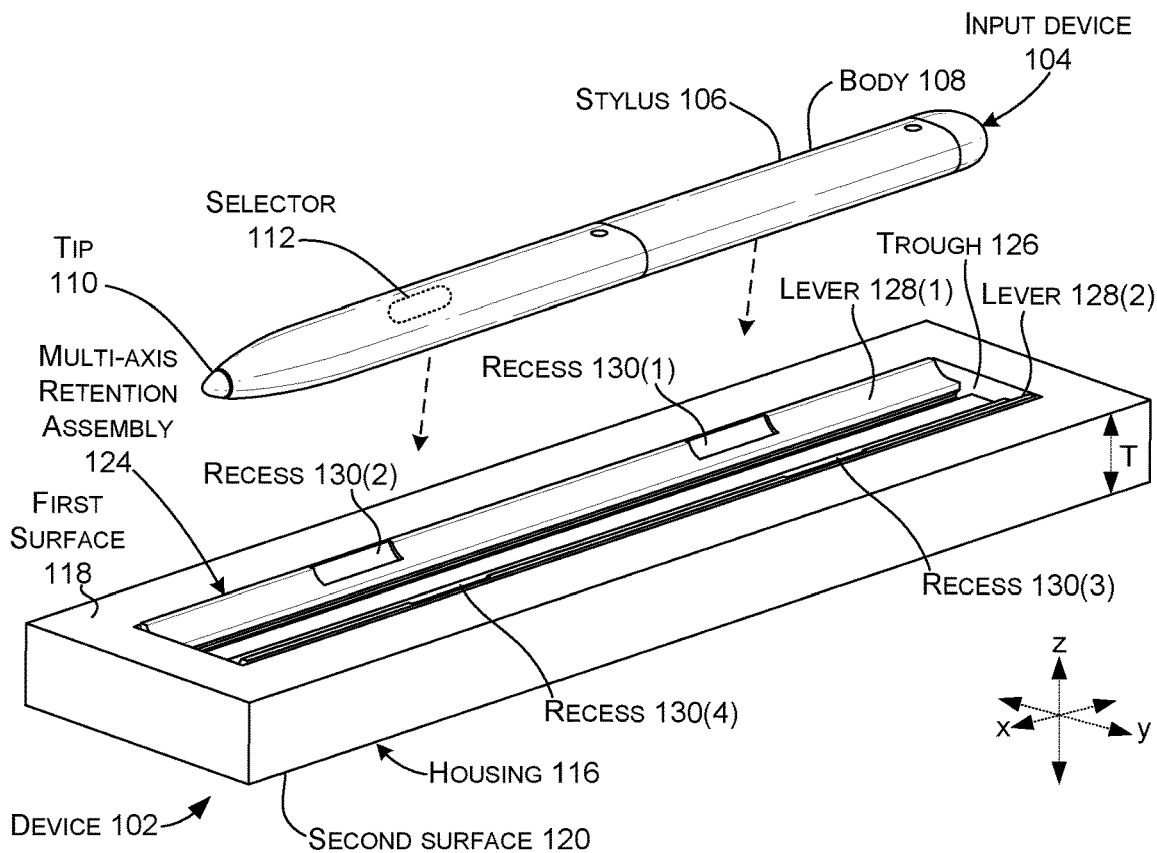
Figure 2B:
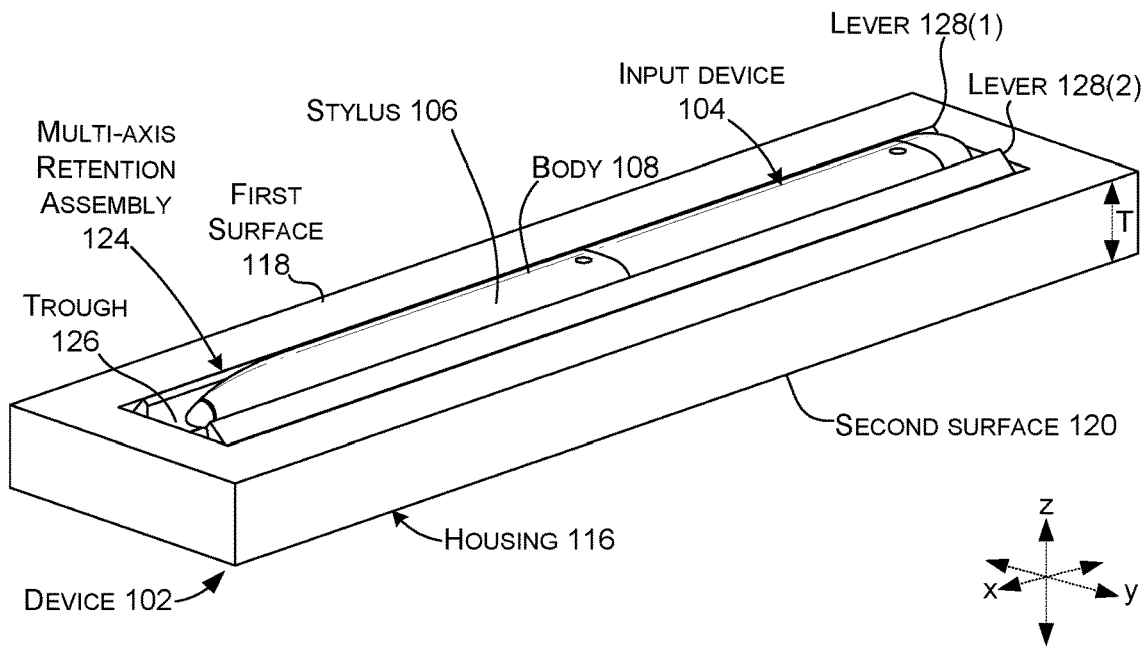
Figure 2C:
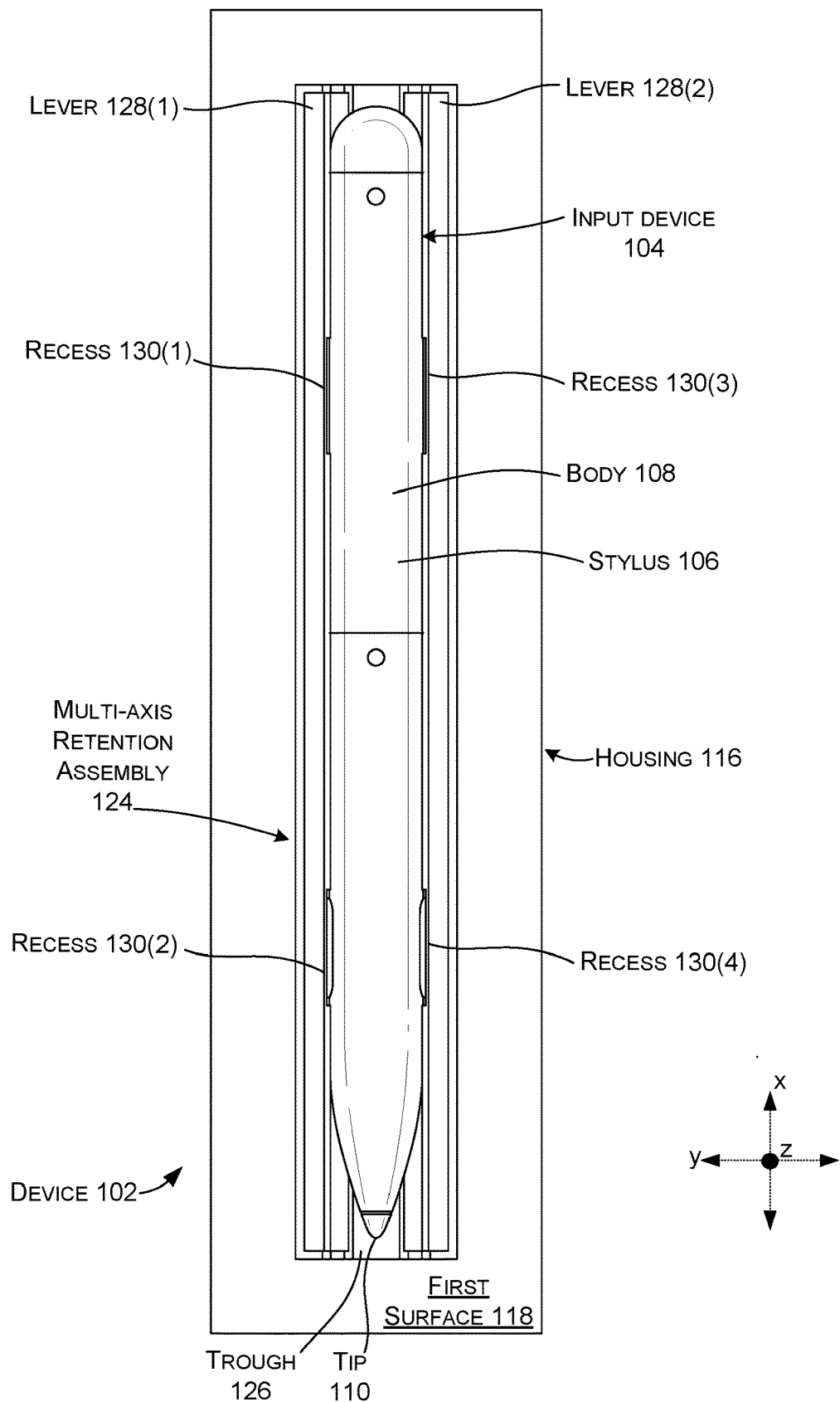
FIGS. 2C and 3A-3D show elevational views of example devices and systems in accordance with some implementations of the present concepts.

Introductory FIGS. 1A-1B and 2A-2C collectively show an example system 100A that can include a device 102 and a corresponding input device 104. FIG. 1A shows the input device removed from device 102 for use. FIG. 1B shows the input device 104 securely stored in the device 102. FIG. 2A is a close-up view that is similar to FIG. 1A and FIG. 2B is a close-up view that is similar to FIG. 1B. FIG. 2C is an elevational view looking down at the first surface with the input device 104 loaded in the device 102.

As shown in FIGS. 1A and 1B, in this case the device 102 is manifest as a notebook computer. Other example devices can include, tablets, smart phones, desktop computers, etc. In this example, the input device 104 is manifest as a digital stylus 106. Other input device examples can include mice, earbuds, etc. One such example is described below relative to FIGS. 5A and 5B. In this implementation, the stylus 106 includes a body 108, a sensing tip 110, and one or more external selectors 112.

The device 102 can include a housing 116 and first and second surfaces 118 and 120. In this case, the surfaces 118 and 120 are separated by a thickness T and thereby define a volume within the housing 116. Various electronic components 122 and/or other components, such as thermal management components can be positioned in the volume. Various types of electronic components 122 can be employed, such as processors, memory, storage, and/or batteries, among others. The electronic components 122 are shown in 'ghost' (e.g., dashed lines) because they would be obscured by the first surface 118 in this view. Consumers tend to prefer relatively thin devices, as such the volume available for the electronic components is limited, especially in the z reference direction (e.g., device thickness).

The device 102 can also include a multi-axis retention assembly 124 for releasably retaining the input device 104. In this case, multi-axis retention assembly 124 can securely retain the input device 104 until the user removes the input device. For instance, the multi-axis retention assembly 124 can retain the input device 104 even when the user loads and unloads the device 102 into their backpack and the input device 104 rubs against the backpack. In order to securely retain the input device, the multi-axis retention assembly 124 can provide retention forces both perpendicular to, and parallel to, the first surface 118. Stated another way, at least some component of the retention forces can be parallel to the first surface and some other component of the retention forces can be perpendicular to the first surface. In some configurations, still other components of the retention forces may be in other intermediary orientations. From another perspective, in some implementations, at least some, but less than all of the total retention forces are parallel to, and perpendicular to, the first surface.

FIG. 2A shows that in this example configuration, the multi-axis retention assembly 124 can include a trough 126 extending from the first surface 118, part way into the device thickness T (e.g., into the device volume). The multi-axis retention assembly 124 can also include first and second levers 128 (e.g., a pair of opposing levers). The levers 128 can transition or toggle from an empty position in FIG. 2A to a loaded position in FIG. 2B where the levers 128 grasp and hold the input device 104. Note also that the levers 128 can have a profile specific to the input device. For instance, the profile can include recesses 130. The recesses 130 can ensure that the levers do not inadvertently activate the selector 112 (e.g., avoid contact between the levers and the selector). In this case, there are four recesses 130 positioned so that no matter what orientation the input device 104 is inserted into the multi-axis retention assembly 124 (e.g., tip 110 positioned at either end of the trough and/or the selector 112 facing up (away from the device hinge) or down (toward the device hinge), the selector 112 will be adjacent to an individual recess 130. In this implementation, the levers 128 run along a majority of a length of the input device 104. An alternative implementation is described below relative to FIGS. 5A and 5B.

FIGS. 2B and 2C show the input device 104 positioned in the trough and the levers 128 positioned around at least a portion of the input device and applying retention forces to the input device. These aspects are described in more detail below relative to FIGS. 3A-3D.

Figure 3A:
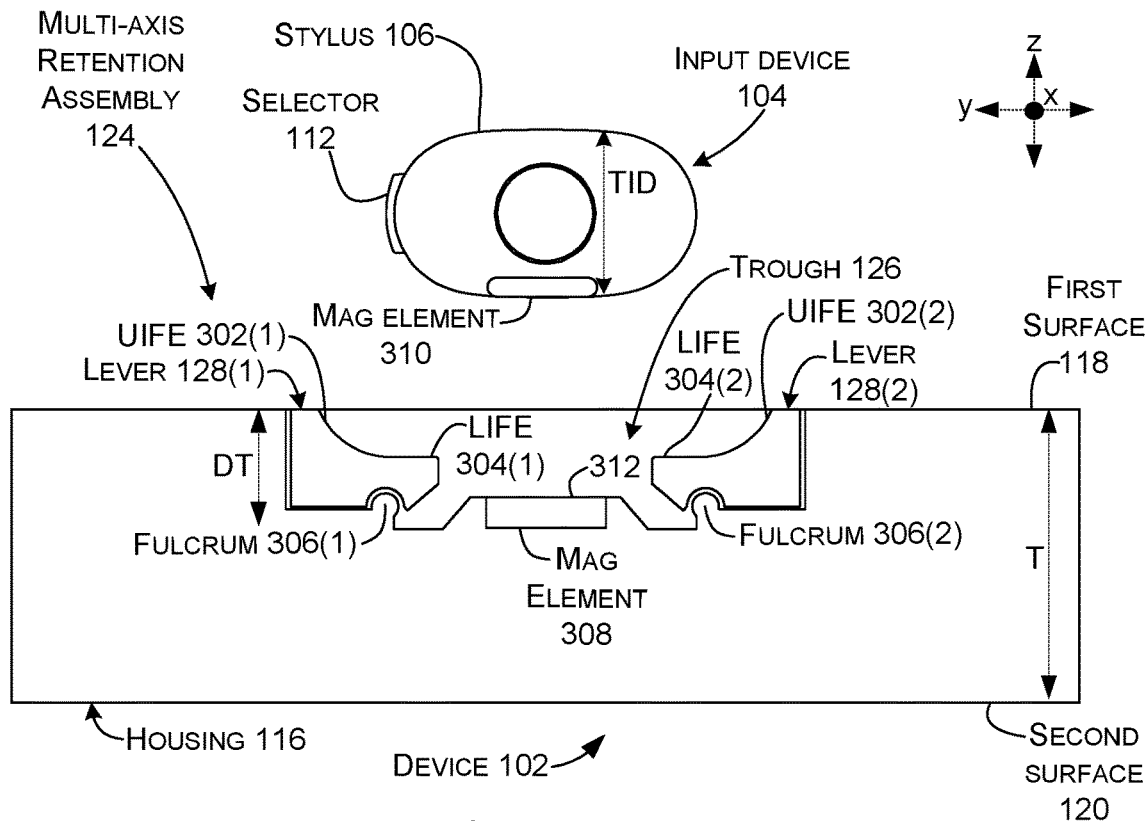
Figure 3B:
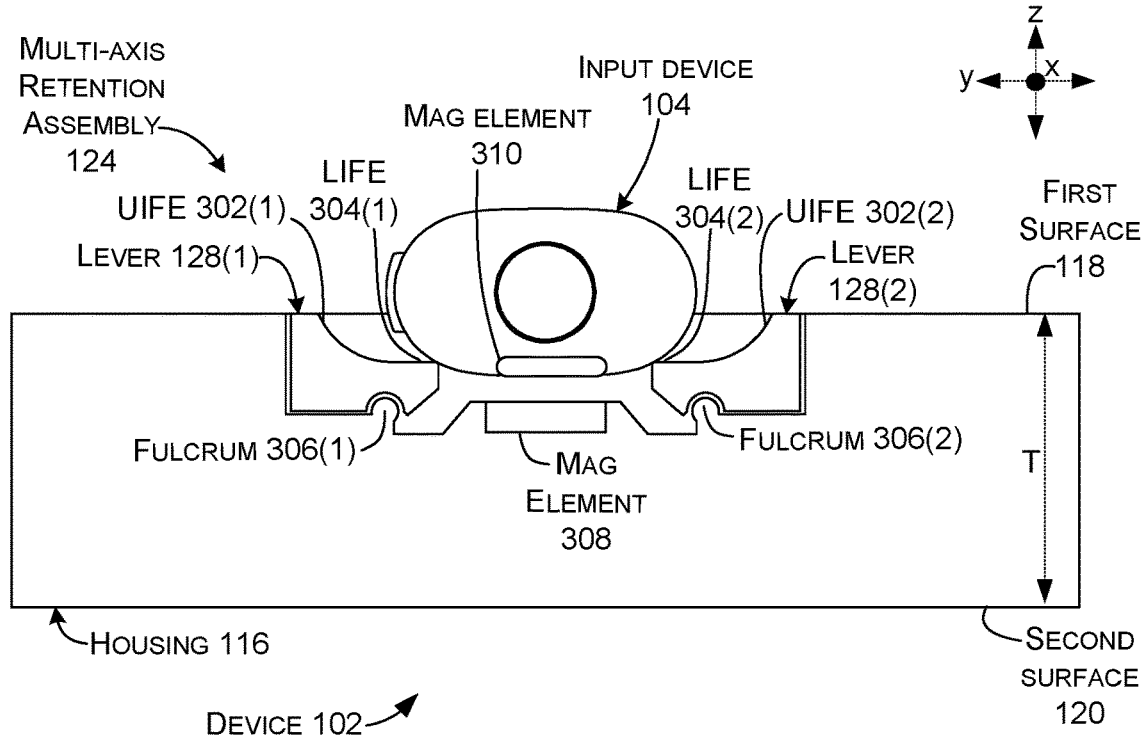
Figure 3C:
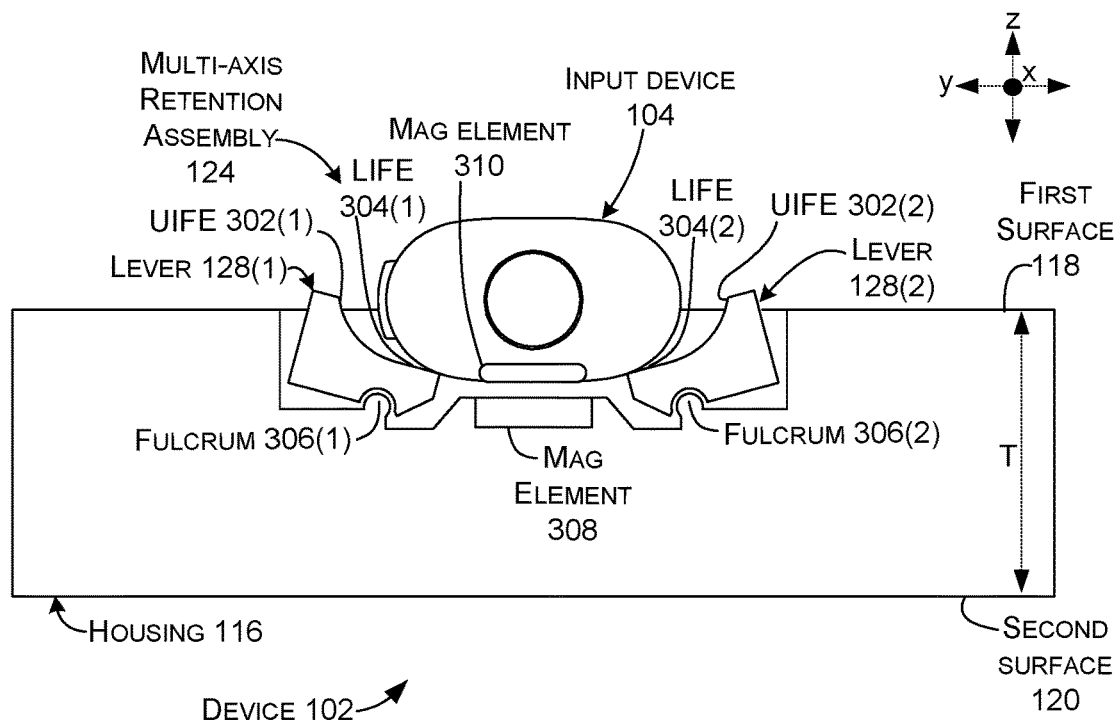
Figure 3D:
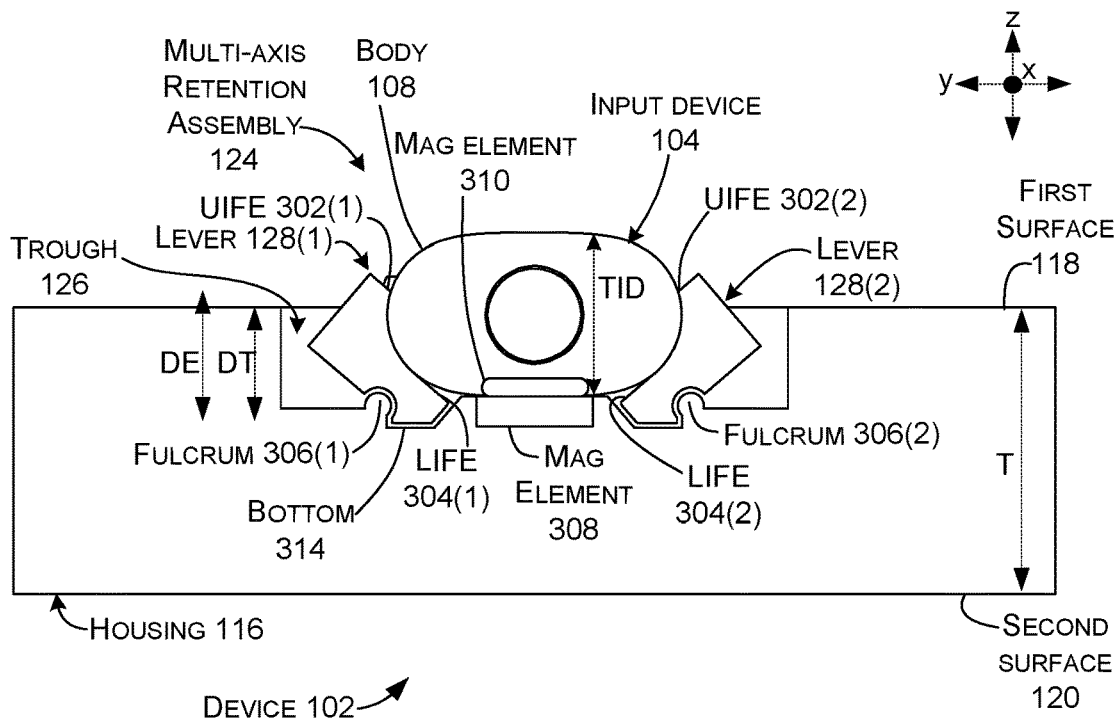

FIGS. 3A-3D collectively show an input device 104 insertion sequence into the multi-axis retention assembly 124. FIGS. 3A-3D are elevational views looking down a length of the input device (e.g., along the x reference direction or axis (along a long axis of the input device)). FIG. 3A shows the input device 104 in the deployed position (e.g., unloaded or not in the multi-axis retention assembly 124). FIG. 3D shows the input device 104 installed in multi-axis retention assembly 124 for storage (e.g., 'stowed,' 'stored,' or 'loaded' position). FIGS. 3B and 3C show the transition from the deployed position of FIG. 3A to the stored position of FIG. 3D.

FIGS. 3A-3D show additional details of the multi-axis retention assembly 124. In this case, the levers 128 can include upper inwardly facing edges (UIFEs) 302 and lower inwardly facing edges (LIFEs) 304. The levers 128 can deploy (e.g., rotate or pivot) around fulcrums 306. As will be explained below, the pivoting levers 128 can provide a technical solution of effectively increasing a depth of the trough 126.

The multi-axis retention assembly 124 can include magnetic elements 308 in the trough 126. In this case, the magnetic elements 308 are positioned in the bottom of the trough 126 between the levers 128. The magnetic elements 308 positioned in the multi-axis retention assembly 124 of the device 102 can operate cooperatively with magnetic elements 310 positioned in the input device 104. Namely, the magnetic elements 308 and 310 can create a magnetic attraction (e.g., magnetic forces) between the input device 104 and the device 102 in the z reference direction (e.g., normal or perpendicular to the first surface 118) that pulls the input device toward the bottom of the trough. The term 'magnetic elements' means that at least one of the magnetic elements is a magnet and the corresponding magnetic element is either another magnet or a ferromagnetic material.

Starting at FIG. 3A, the input device 104 is out of the multi-axis retention assembly 124. For instance, assume that a user has been using the input device 104 to control the device 102, such as to draw on a display of the device 102. Note that with the input device 104 removed (e.g., an empty or unloaded configuration) an entirety of the levers 128 (and other multi-axis retention assembly components) are below the first surface 118 (e.g., between the first surface 118 and the second surface 120). As such, from an aesthetic standpoint, the planar nature of the first surface is not interrupted by elements of the multi-axis retention assembly 124.

Assume at this point, that the user is ready to return the input device 104 to the multi-axis retention assembly 124. The user can simply generally align the input device 104 over the multi-axis retention assembly 124 as shown. At this point, attractive magnetic forces between the magnetic elements 308 in the device 102 and the magnetic elements 310 in the input device 104 can begin to draw the input device 104 into the multi-axis retention assembly 124. Once the magnetic forces attract the input device toward the multi-axis retention assembly 124, the process progresses automatically and the input device 104 can be locked in the multi-axis retention assembly 124 without further action by the user as will be explained below.

At FIG. 3B, the magnetic forces acting between the multi-axis retention assembly 124 and the input device 104 in the z reference direction (e.g., perpendicular to the first surface 118) are causing the input device to contact the LIFEs 304.

FIG. 3C shows the magnetic attractive forces in the z reference direction causing the input device 104 to force the LIFEs 304 downward. This downward movement causes the levers 128 to rotate or pivot around the fulcrums 306. The rotation causes the UIFEs 302 to rotate upward and inward (e.g., in the positive z direction and toward one another).

Note that until this point, an entirety of the levers 128 were below the first surface 118 (e.g., between the first surface 118 and the second surface 120). Now, the upper portions of the levers 128 including the UIFEs 302 are above the first surface 118 (e.g., proud to the first surface).

FIG. 3D shows the input device 104 fully received in the multi-access retention assembly 124. At this point, the magnetic elements 308 and 310 are touching one another (or are in close proximity separated by physical surfaces) and are supplying a retention force (e.g., magnetic force) in the z reference direction (e.g., normal to the first surface 118). Further, the levers 128 have rotated around the fulcrums 306 until the UIFEs 302 are fully engaged against the input device 104 (e.g., against the sides of the body 108). This engagement of the body 108 by the UIFEs 302 can provide retention forces in the x and y reference directions.

The combination of the retention forces in the z reference direction provided by the magnetic elements 308 and 310 and the retention forces in the x and y direction provided by the engagement of the levers 128 on the body 108 can securely retain the input device 104 in the multi-axis retention assembly 124 in a broader range of use case scenarios than can be obtained with a single retention force yet the input device is easy for the user to stow and remove. For instance, a normal retention force alone can maintain the input device 104 in the multi-axis retention assembly 124 if the device 102 is carried upside down. However, the normal magnetic force tends not to retain the input device in a sliding contact scenario in the x and/or y direction, such as when the user slides the device 102 into and/or out of their backpack. However, the addition of the retention forces created by the UIFE's tends to retain the input device 104 in the multi-axis retention assembly 124 in these sliding contact scenarios as well as other scenarios where the normal magnetic forces alone are not sufficient.

In this illustrated configuration of FIG. 3D, the x and y direction retention forces can be enhanced because the UIFEs 302 contact above a widest point of the input device 104. In this case, the widest point of the body 108 occurs horizontally through a midpoint (e.g., half) of the thickness of the input device TID. In this case, this widest point is generally aligned with the first surface 118 of the device 102. The UIFEs 302 extend up past the widest point and are biased toward each other to grasp and retain the input device 104. This configuration can be especially effective at providing x and/or y direction retention forces. Further, this effective configuration is achieved with a multi-axis retention assembly 124 that is completely below the first surface 118 (e.g., hidden) when the input device is removed.

Viewed from another perspective, the pivoting levers 128 can increase an effective depth of the multi-axis retention assembly 124 when the input device 104 is present (e.g., stored) compared to when the input device is removed. This can be evidenced by comparing FIG. 3A and FIG. 3D. Recall that in many thin form factor devices, space, especially space in the z reference direction, is at a premium. Assume in this example that an allocated depth DT of the trough 126 is fixed as an absolute value or percentage value of the device thickness T as shown in FIG. 3A.

This allocated depth DT of the trough 126 may not be adequate to provide the desired retention forces on the input device 104 in the multi-axis retention assembly 124. However, in comparing the loaded or storage configuration of 3D to the empty configuration of FIG. 3A shows that an effective depth (DE) of the multi-axis retention assembly is increased by the pivoting levers 128. Thus, the levers 128 provide an example implementation of how the present concepts can provide a technical solution that effectively increases a depth of the multi-axis retention assembly beyond the occupied or static depth D when an input device is stored in the multi-axis retention assembly, but conform to the depth DT when the input device 104 is removed. Thus, the present concepts can utilize the pair of opposing levers to provide desired retention forces in a thin device and a shallow trough. Stated another way, the trough depth DT can be less than a thickness of the input device and yet the multi-axis retention assembly can effectively retain the input device even if external forces are applied to the device in any or all of the x, y, and z reference directions. From still another perspective, the present concepts can allow less device real estate, especially less z direction real estate to be allocated to the trough while still providing desired (e.g., specified) retention forces in multiple directions.

The inventive concepts allow the relatively shallow trough 126 in device 102 to provide relatively high retention forces for storage of input device 104. When the input device 104 is placed into the trough 126, material raises and clamps the input device 104 for additional mechanical retention. The magnetic elements 308 and 310 can attract the input device 104 to the trough 126 and the input device 104 mechanically adjusts the levers 128 to articulate and clamp the input device 104. Further, by using a combination of magnets and levers to generate the retention forces, the levers do not need to wrap all the way around the input device. Instead, the levers can generate retention forces parallel to the first surface by wrapping only partially around the input device and the magnetic elements can provide retention forces perpendicular to the first surface. Thus, the magnetic elements and the levers can operate cooperatively to achieve a better functionality than can be obtained with either component alone.

FIGS. 3A-3D show multi-axis retention assembly 124 that can include trough 126 formed relative to surface 118 of device 102. The multi-axis retention assembly 124 can include magnetic elements 308 and mechanical levers 128 near the trough opening. When the input device 104 is placed into the trough 126 the input device becomes magnetically coupled to a lower surface 312 (FIG. 3A) in the trough 126. The magnetic coupling of the input device 104 to the lower surface 312 in the trough 126 causes rotation of the rotatable levers 128 so that they will move to a position at which the levers 128 are in contact with the surface of the input device 104. The levers 128 can have an inner surface that has a shape that allows contact between a relatively large amount of surface area of the lever (e.g., UIFEs 302) that faces the input device when the levers 128 are rotated by the input device being magnetically coupled to the surface 312 in the trough 126. Stated another way, the inner surface shape of the levers 128 can approximate an outer surface shape of the input device 104 that is contacted by the levers 128. This aspect can further increase retention forces between the levers 128 and the input device 104.

In some implementations, the pivoting levers 128 can contact the input device 104 above its midpoint. A curved input device 104 may be widest at its midpoint and have a decreasing dimension above the midpoint. By contacting the input device above its midpoint, the device curvature may allow the levers 128 to exert greater retention forces than would otherwise be the case. This can be accomplished with a trough depth that is equal to or less than half the thickness of the input device. Thus, the present implementations can provide a technical solution of a relatively shallow trough depth, while the pivoting nature of the levers 128 can effectively engage a greater proportion of the input device as though the trough was actually deeper.

Note also, that in some implementations, the levers 128 can function as, and/or trigger, a switch that controls another functionality. For instance, the levers 128 can function as a switch that is off (e.g., electrically open) when the input device 104 is removed from the device 102. The switch remains open unless the input device 104 is restowed and causes the levers 128 to pivot and contact the bottom of the trough 126 as indicated at 314 in FIG. 3D. In this example, then the levers 128 are pivoted by the input device 104, the levers can contribute to the switch (electrically closing) that turns on charging of the input device 104. When the input device is removed and the levers return to the orientations of FIG. 3A-3C the switch 'opens' and charging stops. Controlling other functionalities beyond this example with the levers is contemplated. Other switch configurations associated with the pivoting levers are also contemplated.

Figure 4A:
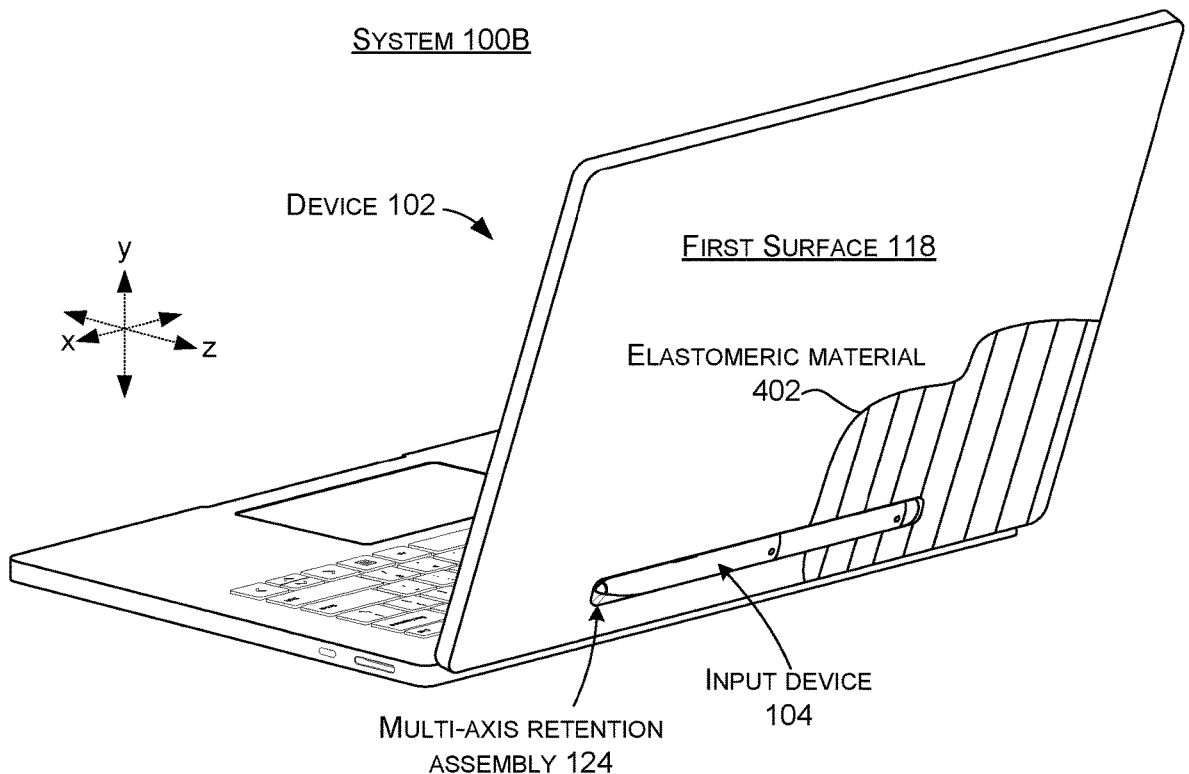
Figure 4B:
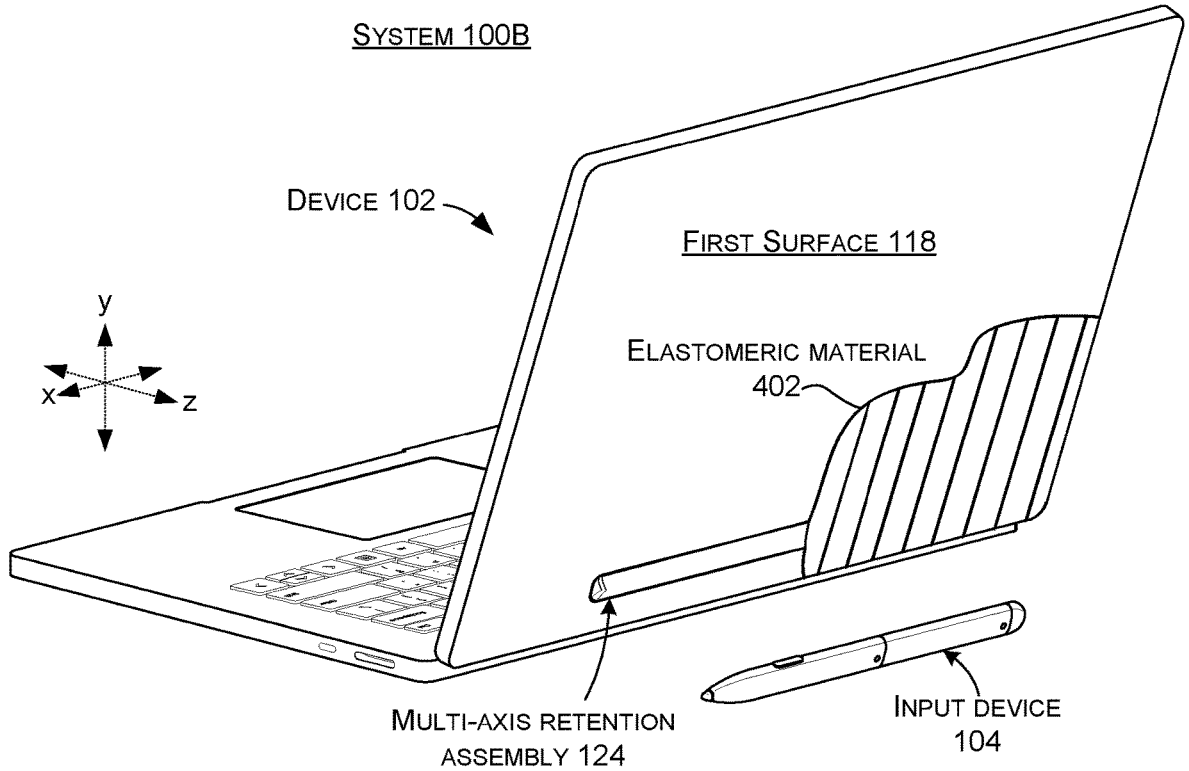

FIGS. 4A and 4B collectively show another system 100B that includes device 102 and input device 104. The input device 104 can be stored in multi-axis retention assembly 124 that is formed relative to first surface 118. In this case an elastomeric material 402 (shown in cutaway) is positioned over the first surface 118 including over the multi-axis retention assembly 124. As shown in FIG. 4A, the elastomeric material 402 can stretch to allow the input device 104 to be stored in the multi-axis retention assembly 124. FIG. 4B shows the elastomeric material 402 can assume a generally planar shape conforming to first surface 118 when the input device is removed. The planar shape assumed by the elastomeric material 402 can generally obscure the multi-axis retention assembly so that it appears as though it is not there (e.g., that the first surface is continuous). When the user wants to stow the input device 104, the user simply positions the input device close to the 'hidden' multi-axis retention assembly and the magnetic elements (shown and discussed relative to FIGS. 3A-3D) do the rest.

Figure 5A:
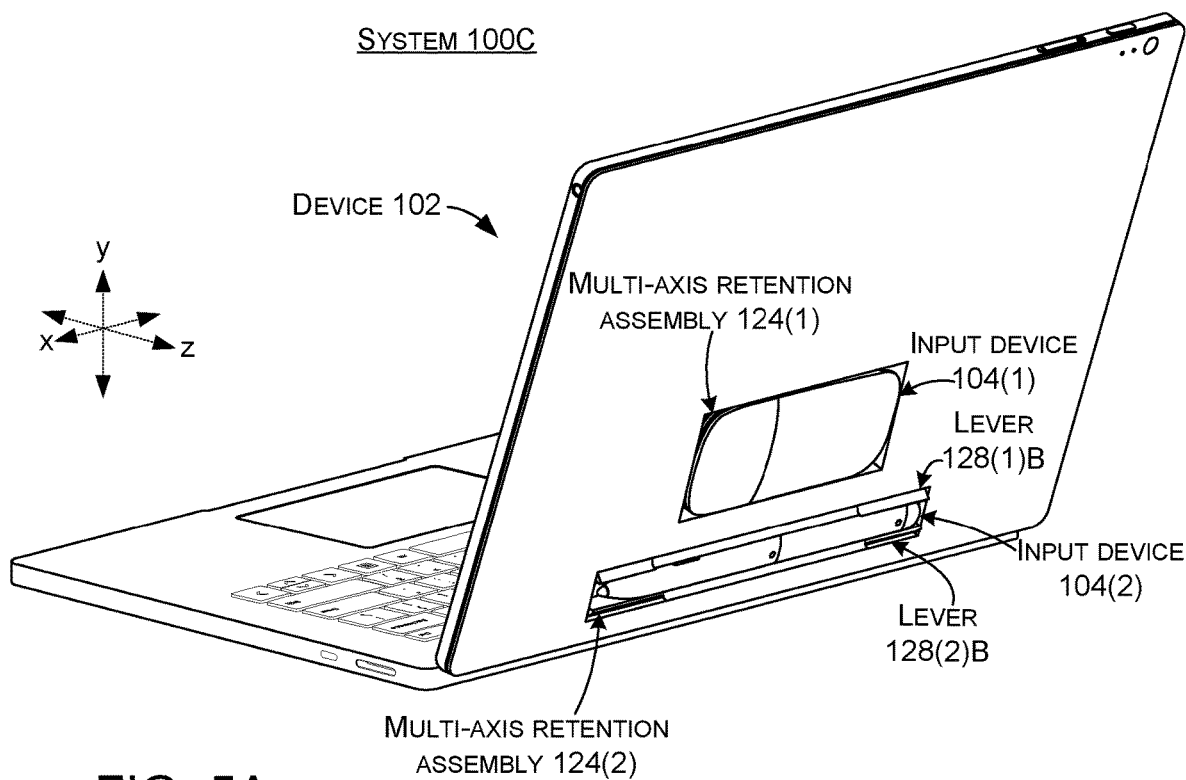
Figure 5B:
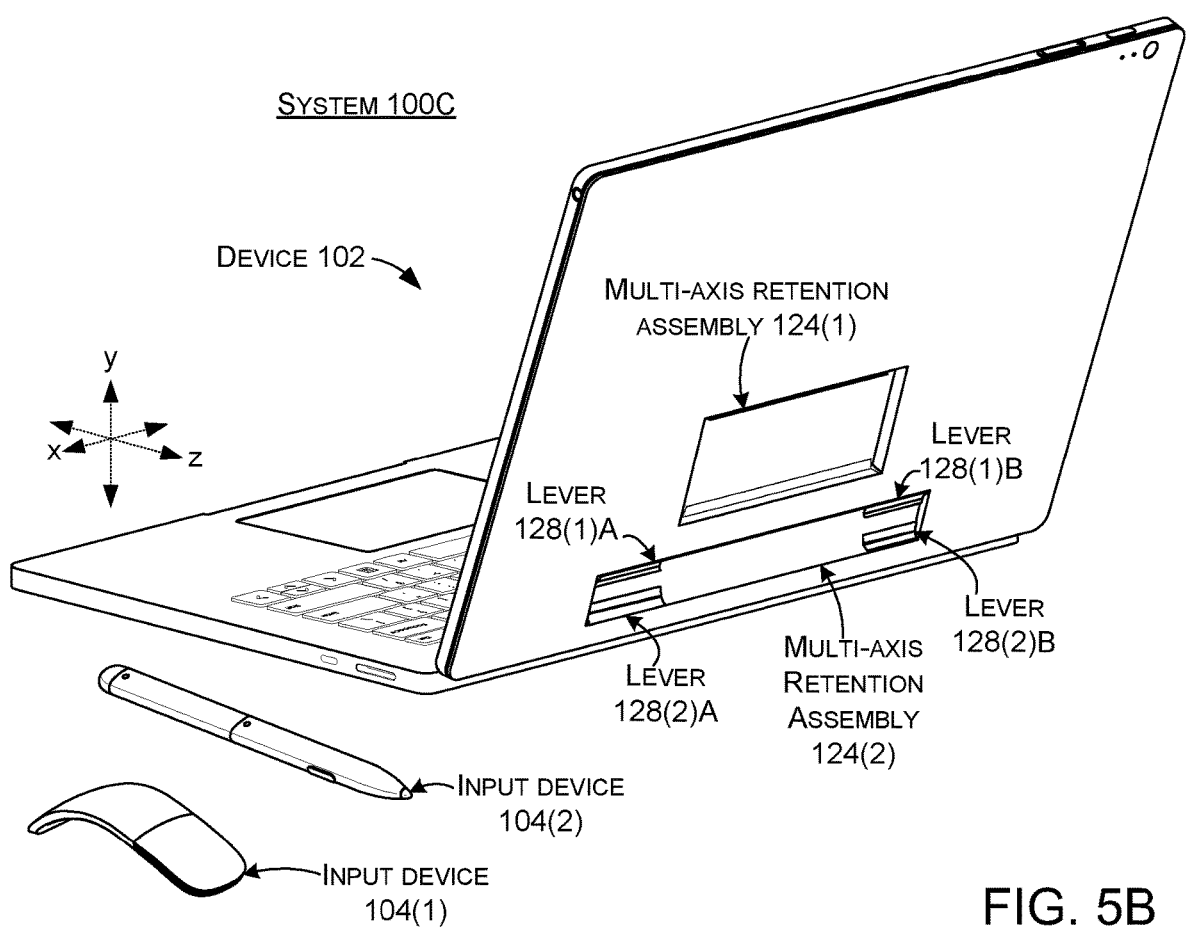

FIGS. 5A and 5B collectively show another system 100C that includes device 102 and input devices 104(1) and 104(2). In this case, input device 104(1) is manifest as a collapsible mouse and input device 104(2) is manifest as a stylus. The input device 104(1) can be stored in multi-axis retention assembly 124(1) and input device 104(2) can be stored in multi-axis retention assembly 124(2). The input devices 104 can be reliably retained by the multi-axis retention assemblies 124 yet are easily removed and restowed as desired by the user.

In this implementation, multi-axis retention assembly 124(2) includes two pairs of levers 128(1)A and 128(2)A and 128(1)B and 128(2)B. In this case, the pairs of levers are positioned proximate to the ends of the multi-axis retention assembly 124(2) and hence they capture the ends of the input device 104. This configuration can provide effective retention of the input device 104 and can occupy less device thickness in the central region of the multi-axis retention assembly than may be the case when the levers run through the central region.

Individual elements of the multi-axis retention assemblies 124 can be made from various materials, such as metals, plastics, and/or composites. These materials can be prepared in various ways, such as from formed sheet metals, die cast metals, machined metals, 3D printed materials, molded or 3D printed plastics, and/or molded or 3D printed composites, among others, and/or any combination of these materials and/or preparations can be employed.

The present multi-axis retention assembly concepts can be utilized with any type of device, such as but not limited to notebook computers, smart phones, wearable smart devices, tablets, vehicles, appliances, and/or other types of existing, developing, and/or yet to be developed devices.

Various methods of manufacture, assembly, and/or use for multi-axis retention assembly 124 are contemplated beyond those shown above relative to FIGS. 1A-5B.

Various examples are described above. Additional examples are described below. One example includes a device comprising a housing defining a volume between opposing first and second surfaces, electronic components positioned in the volume, an input device configured to communicate with the electronic components, and a multi-axis retention assembly positioned in the first surface and configured to releasably retain the input device at least partially in the volume, the multi-axis retention assembly providing retention forces both parallel and perpendicular to the first surface.

Another example can include any of the above and/or below examples where the multi-axis retention assembly defines a trough that extends from the first surface into the volume.

Another example can include any of the above and/or below examples where the multi-axis retention assembly comprises first magnetic elements and the input device includes second magnetic elements and the first and second magnetic elements generate the perpendicular retention force.

Another example can include any of the above and/or below examples where the multi-axis retention assembly further comprises levers that are contained within the volume when the input device is removed.

Another example can include any of the above and/or below examples where the levers rotate above the first surface when the input device is installed in the trough to contact sides of the input device.

Another example can include any of the above and/or below examples where the levers contact more than half of a thickness of the input device when the input device is installed in the trough.

Another example can include any of the above and/or below examples where the perpendicular retention force causes the levers to automatically deploy around the input device as the input device is pulled into the trough by the perpendicular retention force.

Another example can include any of the above and/or below examples where the input device includes selectors and wherein the levers include recesses that align with the selectors to avoid contacting the selectors.

Another example can include any of the above and/or below examples where the input device is configured to communicate user input received on the input device to the electronic components.

Another example can include any of the above and/or below examples where the input device comprises a stylus, a mouse, or earbuds.

Another example includes a device comprising a housing, a trough defined in the housing and configured to receive at least a portion of an input device, and a pair of opposing levers that are contained in the trough when the trough is empty and that pivot proud out of the trough around and against the input device installed in the trough.

Another example can include any of the above and/or below examples where a depth of the trough is less than a thickness of the input device, and wherein a depth of the trough increases as the pair of opposing levers pivot out of the trough.

Another example can include any of the above and/or below examples where the input device includes an external selector and wherein a profile of the pair of opposing levers is configured to avoid contacting the external selector.

Another example can include any of the above and/or below examples where the pair of opposing levers comprises a single pair of opposing levers or multiple pairs of opposing levers.

Another example can include any of the above and/or below examples where the pair of opposing levers contact a majority of a length of the input device.

Another example can include any of the above and/or below examples where the device further comprises magnetic elements positioned under the trough and configured to align with corresponding magnetic elements of the input device.

Another example can include any of the above and/or below examples where the trough is formed in a first surface of the housing and wherein the magnetic elements under the trough and the magnetic elements of the input device create a retention force on the input device normal to the first surface.

Another example can include any of the above and/or below examples where the pair of opposing levers creates a retention force on the input device that is parallel to the first surface of the housing.

Another example can include any of the above and/or below examples where the retention force on the input device that is normal to the first surface of the housing causes the input device to contact the pair of opposing levers and causes the pair of opposing levers to pivot proud out of the trough around and against the input device.

Another example can include any of the above and/or below examples where the pair of levers function as a switch that is open when the trough is empty and that is closed when the input device is installed in the trough.

Another example includes a device comprising a housing, a trough defined in the housing, and a pair of opposing levers that define upper inwardly facing edges that are spaced away from one another in an unloaded position and biased toward one another in a loaded position.

Although techniques, methods, devices, systems, etc., pertaining to multi-axis retention assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
   a housing defining a volume between opposing first and second surfaces;
   electronic components positioned in the volume;
   an input device configured to communicate with the electronic components; and,
   a multi-axis retention assembly positioned in the first surface and configured to releasably retain the input device at least partially in the volume utilizing a pair of opposing levers that are configured to pivot out of the volume when contacted by the input device in the volume and the pair of opposing levers are configured to create a retention force on the input device that is generally parallel to the first surface.

2. The device of claim 1, wherein the multi-axis retention assembly defines a trough that extends from the first surface into the volume and wherein the pair of opposing levers are positioned proximate to the trough.

3. The device of claim 2, wherein the multi-axis retention assembly comprises first magnetic elements and the input device includes second magnetic elements and the first and second magnetic elements generate a perpendicular retention force and create the contact between the pair of opposing levers and the input device in the volume.

4. The device of claim 3, wherein the pair of opposing levers that are contained within the volume when the input device is removed from the volume.

5. The device of claim 4, wherein the pair of opposing levers rotate above the first surface and contact the input device when the input device is installed in the trough forced to contact the pair of opposing levers by magnetic attraction between the first magnetic elements of the multi-axis retention assembly and the second magnetic elements of the input device.

6. The device of claim 5, wherein the pair of opposing levers contact more than half of a thickness of the input device when the input device is installed in the trough.

7. The device of claim 6, wherein the perpendicular retention force causes the pair of levers to automatically deploy around the input device as the input device is pulled into the trough by the perpendicular retention force.

8. The device of claim 6, wherein the input device includes selectors and wherein the pair of levers include recesses that align with the selectors to avoid contacting the selectors.

9. The device of claim 1, wherein the input device is configured to communicate user input received on the input device to the electronic components.

10. The device of claim 9, wherein the input device comprises a stylus, a mouse, or earbuds.

11. A device, comprising:
    a housing;
    a trough defined in the housing and configured to receive at least a portion of an input device; and,
    a pair of opposing levers that are contained in the trough when the trough is empty and portions of the pair of opposing levers pivot proud out of the trough around and against the input device when the input device is installed in the trough and contacts the pair of opposing levers.

12. The device of claim 11, wherein a depth of the trough is less than a thickness of the input device, and wherein a depth of the trough increases as the pair of opposing levers pivot proud out of the trough.

13. The device of claim 11, wherein the input device includes an external selector and wherein a profile of the pair of opposing levers is configured to avoid contacting the external selector.

14. The device of claim 11, wherein the pair of opposing levers comprises a single pair of opposing levers or multiple pairs of opposing levers.

15. The device of claim 11, wherein the pair of opposing levers contact a majority of a length of the input device.

16. The device of claim 11, further comprising magnetic elements positioned under the trough and configured to align with corresponding magnetic elements of the input device.

17. The device of claim 16, wherein the trough is formed in a first surface of the housing and wherein the magnetic elements under the trough and the magnetic elements of the input device create the contact between the input device and the pair of opposing levers and create a retention force on the input device normal to the first surface.

18. The device of claim 17, wherein the pair of opposing levers creates a retention force on the input device that is parallel to the first surface of the housing.

19. The device of claim 11, wherein the pair of levers function as a switch that is open when the trough is empty and that is closed when the input device is installed in the trough.

20. A device, comprising:
    a housing;
    a trough defined in the housing; and,
    a pair of opposing levers that define upper inwardly facing edges that are contained within the trough and the upper inwardly facing edges are spaced away from one another when the trough is empty and when an input device is installed in the trough and contacts the pair of opposing levers the upper inwardly facing edges are configured to move toward one another and against the input device.

* * * * *